May 5, 1953 — L. N. POND — 2,637,429
GLASS CHARGE DISTRIBUTING APPARATUS
Filed May 12, 1948 — 2 SHEETS—SHEET 1
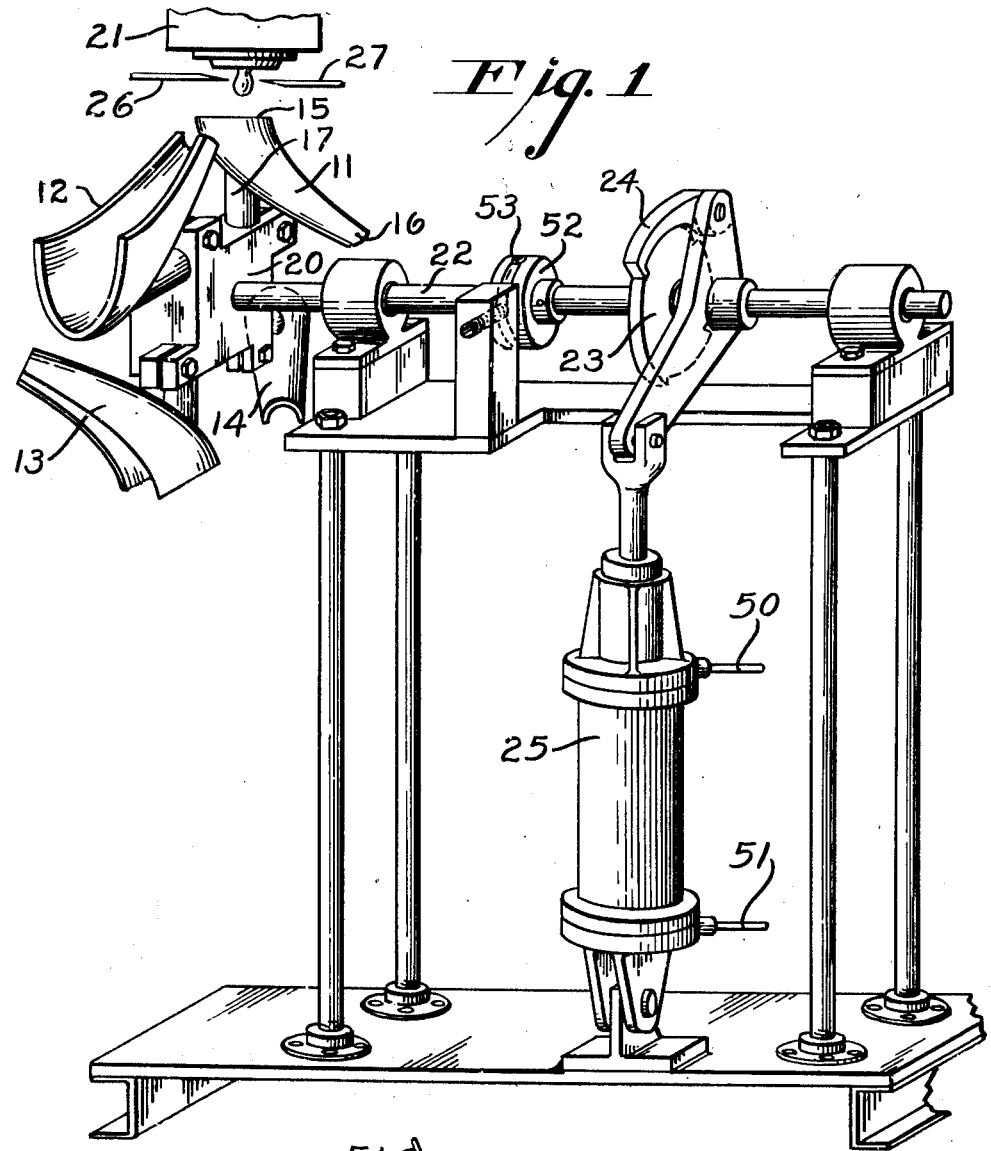
Fig. 1
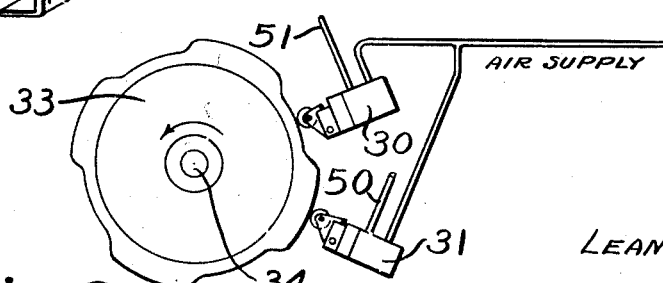
Fig. 3
Inventor
LEANDER N. POND
By F. H. Knight
Attorney May 5, 1953  L. N. POND  2,637,429
GLASS CHARGE DISTRIBUTING APPARATUS
Filed May 12, 1948  2 SHEETS—SHEET 2
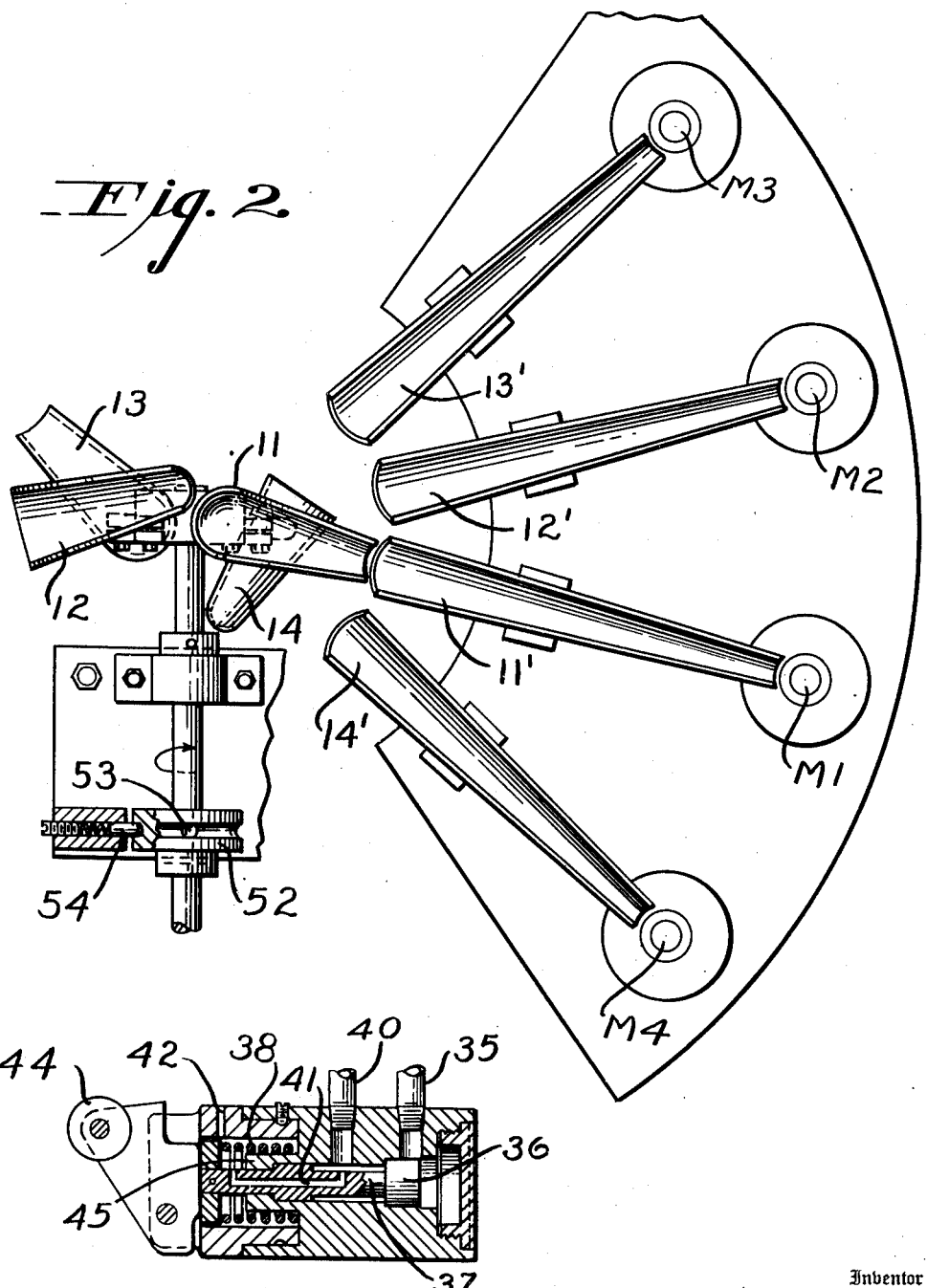
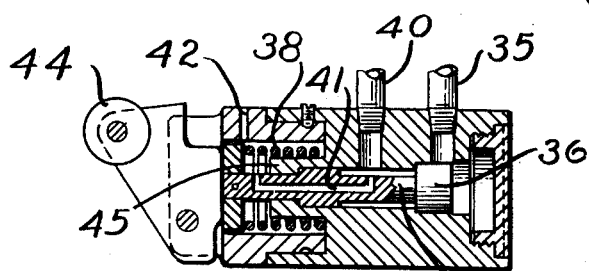
Inventor
LEANDER N. POND
By
Attorney Patented May 5, 1953

2,637,429

UNITED STATES PATENT OFFICE 2,637,429

GLASS CHARGE DISTRIBUTING APPARATUS

Leander N. Pond, Corning, N. Y., assignor to Corning Glass Works, Corning, N. Y., a corporation of New York Application May 12, 1948, Serial No. 26,640

4 Claims. (Cl. 193—2)

The present invention relates to the delivery of charges of molten glass from a glass feeder to molds of a glass fabricating machine or machines.

The prime object of the invention is a simple form of apparatus for distributing mold charges of glass from a single feeding means to a relatively large number of mold-charging stations successively and in a predetermined cyclic order.

Other objects and advantages of the invention will be apparent from the following description when considered in conjunction with the accompanying drawings in which:

Fig. 1 is a perspective view of a charge-distributing apparatus embodying the invention, with a glass-receiving trough thereof shown arranged under the bottom outlet of a forehearth.

Fig. 2 is a plan view showing a fragment of the apparatus of Fig. 1 positioned to deliver successively-received mold charges to different molds.

Fig. 3 is a view of control equipment for the apparatus of Fig. 1.

Fig. 4 is an enlarged sectional view of a valve such as may be employed as either valve of the control equipment of Fig. 3.

Referring to the drawings in detail, the charge distributer proper comprises four troughs 11–14, each having a charge receiving end 15 and a delivery end 16. Each trough has a supporting spindle, such as 17, whose axial center is coextensive with the center of the charge receiving end, such as 15, of trough 11. The trough-supporting spindles have their free ends adjustably clamped in sockets in the sides of a support, hereinafter referred to as a trough carrier block 20, mounted on a horizontal shaft 22 adapted to rotate the block to successively bring the receiving ends of troughs 11—14 under the bottom outlet of an associated forehearth 21.

The shaft 22 is turned in step-by-step fashion to successively bring the receiving ends of the troughs under the outlet of the forehearth by a ratchet disk 23 having a driving pawl 24 actuated by a pneumatic unit 25. Unit 25 is actuated in proper synchronism with charge severing shear blades 26 and 27 under control of like air supply valves 30 and 31 alternately actuated by a cam 33 carried by a shaft 34 which may also comprise an element of the shear control mechanism.

As can be seen from an inspection of Fig. 4, when a valve such as 30 or 31 is in its normal position, air supplied to an intake pipe such as 35 is blocked from passage through the valve by a member 36 of a slide element 37 normally held in the position shown by a spring 38. On the other hand, at this time a pipe 40 for connection with an end of a pneumatic unit, such as unit 25, for example, is connected to atmosphere via a passage 41 through slide 37 and a passage 42 of the valve housing. The slide 37 is moved to the right when a lobe of a cam, such as cam 33, moves under the slide actuating roller 44 thereof. In the latter position of the slide, portion 45 of the valve housing blocks passage 41, while member 36 opens a passage in the valve between pipes 35 and 40, thus admitting operating air to the end of the unit to which pipe 40 is connected.

Referring now to Figs. 1 and 3, it will be appreciated that, as illustrated, valve 31 is supplying operating air via its pipe 50 to the upper end of unit 25, and accordingly the pawl 24 has just moved over ratchet disk 23 preparatory to turning it to replace trough 11, now under the forehearth outlet, with trough 12. As will be understood from the description of Fig. 4, at this time valve 30 being in its normal position, the line 51 extending from the lower end of unit 25 is connected with atmosphere through valve 30. As will be apparent, when cam 33 turns sufficiently to enable valve 31 to restore and to operate valve 30, operating air will be supplied to line 51 and line 50 will be connected to atmosphere enabling the unit 25 to position trough 12 under the forehearth outlet.

Shaft 22 is provided with a grooved drum 52 having detents 53 into one of which a springloaded member 54 (Fig. 2) comes to rest after each turning movement to prevent over-run of the shaft when positively driven in a clockwise direction and to prevent its backward movement when the pawl is being retracted.

As previously mentioned, the trough-supporting spindles, such as spindle 17 for example, are centered with the charge receiving openings of the troughs. This arrangement permits a trough to be turned about the axis of its support to bring its delivery end to any desired angular position with respect to the fixed path of travel of the receiving end of the trough. As illustrated in the accompanying drawings, troughs 11—14 are adjusted to deliver charges received thereby to similarly numbered troughs 11'—14' with which they are brought into alignment just before receiving glass charges. Troughs 11'—14' direct the received charges into the associated molds M1—M4 of suitable glass presses (not shown).

Of course the arrangement of troughs 11—14 to deliver the charges received by them to different positions or to feed all charges to the same position is a matter of choice in adjustment of the troughs. For example, troughs 11 and 13 may both be adjusted to deliver charges to any one of the molds M1 and M3, and troughs 12 and 14 adjusted to deliver glass to one or more of the remaining molds. Alternatively, troughs 11—14 can be positioned to deliver all glass to a single mold, should the need require it.

What is claimed is:

1. In combination, a group of glass charge delivery troughs having glass charge receiving ends arranged adjacent one another and glass charge delivery ends in alignment with different molds for receipt of charges of glass delivered to the respective troughs, and a glass distributor comprising a support rotatable about a horizontal axis, a plurality of troughs fixed to said support and arranged about the axial center thereof, said latter troughs adapted for alignment with the outlet of a feeder and the receiving ends of different ones of said first troughs in succession as said support is rotated, and means for rotating said support.

2. In a material charge delivery apparatus, a rotatable support, a plurality of troughs pivotally carried on said support and each having a charge-receiving and a charge-delivery end, the charge-receiving end of each trough being aligned with the axis of its pivot and alignable with a feeder outlet by rotation of said support about its axis so that any trough can be turned about its pivot to adjust the position of its delivery end while retaining its receiving end in position for alignment with the feeder outlet.

3. A material charge distributor for use in the delivery of charges of material to a row of fixed delivery positions alongside one another, comprising a rotatable support, a plurality of troughs fixed to said support and arranged about the axial center thereof, said troughs being adapted for alignment with a feeder outlet and with different ones of said fixed delivery positions in succession as said support is rotated, and means for rotating said support.

4. For use in the delivery of material charges from a feeder outlet to a plurality of fixed positions, a rotatable support provided with a plurality of charge delivery troughs, each trough having a receiving end available to said outlet by rotation of said support and having a delivery end available to one of such fixed positions whenever its receiving end is available to said outlet.

LEANDER N. POND.

References Cited in the file of this patent

UNITED STATES PATENTS

| Number | Name | Date |
| --- | --- | --- |
| 1,439,384 | Soubier | Dec. 19, 1922 |
| 2,199,598 | Robbins | May 7, 1940 |
| 2,293,860 | Sloan | Aug. 25, 1942 |

FOREIGN PATENTS

| Number | Country | Date |
| --- | --- | --- |
| 20,402 | Great Britain | Sept. 27, 1907 |